United States Patent [19]

Olivier

[11] 3,995,771

[45] Dec. 7, 1976

[54] FEEDING DEVICE FOR PARTICULATE MATTER

[75] Inventor: Charles D. Olivier, New Orleans, La.

[73] Assignee: Kaiser Aluminum & Chemical Corporation, Oakland, Calif.

[22] Filed: May 19, 1975

[21] Appl. No.: 578,860

[52] U.S. Cl. .............................. 222/61; 222/195; 222/1; 34/57 A; 259/DIG. 17; 302/29

[51] Int. Cl.² .................................. B67D 5/08

[58] Field of Search .................. 222/193–195, 222/61, 64, 67, 1, 70, 52; 34/57 A, 57 R, 10; 302/29, 45, 48; 259/DIG. 17, 4 R

[56] References Cited

UNITED STATES PATENTS

| | | | |
|---|---|---|---|
| 2,502,953 | 4/1950 | Jahnig | 34/10 |
| 2,538,235 | 1/1951 | Coffey | 302/29 |
| 2,697,653 | 12/1954 | Nicholson | 302/29 |
| 2,859,759 | 11/1958 | Hurwitz | 222/61 |
| 2,909,424 | 10/1959 | Jukkola | 302/29 |
| 3,024,071 | 3/1962 | Morrow | 302/29 |
| 3,672,069 | 6/1970 | Reb et al. | 34/57 A |

FOREIGN PATENTS OR APPLICATIONS

| | | | |
|---|---|---|---|
| 559,540 | 7/1958 | Canada | 302/29 |
| 1,016,397 | 9/1957 | Germany | 302/29 |

Primary Examiner—Allen N. Knowles
Assistant Examiner—H. Grant Skaggs
Attorney, Agent, or Firm—Paul E. Calrow; Edward J. Lynch

[57] ABSTRACT

The invention relates to a method and device for accurately feeding discrete quantities of pulverulent material in a repetitive manner. The invention is advantageously employed in feeding particulate matter to a gas-solids contacting apparatus which is under positive pressure and particularly such apparatus which treat the fluoride containing off-gases from an aluminum reduction cell with particulate alumina to remove fluorides from such off-gases.

12 Claims, 10 Drawing Figures

FEEDING DEVICE FOR PARTICULATE MATTER

BACKGROUND OF THE INVENTION

This invention generally relates to a method and device for accurately feeding discrete quantities of finely divided particulate matter and in particular is directed to such methods and devices in association with a gas-solids containing apparatus.

Many methods and devices are known for feeding pulverulent material in discrete quantities in cyclical manner. Volumetric mechanical devices are usually adequate from the standpoint of consistently feeding or discharging the same quantity of particulate material, but the wear and tear, due to the abrasive nature of many finely divided materials, renders the maintenance of such devices both difficult and expensive. Feeding devices which involve fluidizing the finely divided material avoid much of the abrasion problems characteristic of the mechanical devices, but such devices normally are not capable of consistently providing the same quantity of discrete amounts of pulverulent material in a cyclical manner.

In the operation of gas-solids contacting apparatus, such as fluidized beds, heat exchangers, gas-solids reactors, gas scrubbers and the like, the accurate feeding or discharging of particulate matter to or from the apparatus is quite important to control the process within the apparatus. Most gas-solids contacting devices are operated under a positive pressure which makes the introduction or removal of discrete quantities of particulate matter very difficult without excessive pressure drop. High pressure drops can increase the operational cost of such a process and can cause loss of particulate matter into the surrounding environment. The latter point can be critical if the particulate matter is a hazardous substance.

A feeding device is described in U.S. Pat. No. 3,411,666 wherein particulate matter is fed to a fluidizing container and fluidizing gas is introduced in a controlled manner so that the amount of fluidized particulate matter fed over the edge of the container is controlled in a desired manner. The device can feed discrete quantities of particulate matter in a repetitive manner, but the accuracy of the feeding device is not adequate for many purposes. Moreover, the device is ineffective in feeding particulate matter to a gas-solids contacting apparatus where such units would provide significant back pressure on the feeding unit.

It is against this background that the present invention was developed.

DESCRIPTION OF THE INVENTION

This invention relates to an improved method and device for accurately feeding discrete quantities of finely divided particulate matter in a cyclic or repetitive manner. The invention has special application in the feeding of particulate matter to or the discharging of particulate matter from gas-solids contact devices with little or no pressure drop and essentially no loss of particulate material to the atmosphere which can cause dust formation around the feeder.

The feeder of the invention comprises an essentially closed container provided with a feed opening in the upper portion and a discharge opening in the lower portion. A feed pipe or downspout, which is in communication with a particulate source, passes through the feed opening and into the lower section of the container. A first fluidizing zone is disposed beneath the downspout, and a second fluidizing zone is disposed adjacent the first. Preferably, a vertically disposed baffle depending from the upper portion of the container is provided which defines in part a chamber within the container above the first fluidizing zone and at least a portion of the second.

Particulate matter passes through the downspout into the first fluidizing zone, generally making a cone-shaped mass of particulate matter. The feeding continues until the mass builds up to the discharge end of the feed spout so as to stop the feeding of particulate matter. The cone angle $\theta$ of the particulate mass will generally be the angle of repose of the particulate matter being fed. Gas is introduced into the particulate mass in the first zone, fluidizing the mass and causing further feeding of particulate matter through the feed spout. Fluidization continues until the desired amount of fluidized material is obtained in the chamber defined in part by the baffle. The fluidizing gas is turned off and the particulate matter settles. As the particulate matter settles, the particulate mass in the first zone again builds up to the discharge end of the feed spout so as to stop the further feeding of particulate matter into the first zone. The baffle, positioned above the second fluidizing zone, directs a portion of the settling particulate matter to the second zone so that substantially all of the fluidizing surface in the second zone is covered with particulate matter. Gas is then introduced into the particulate mass in the second zone, fluidizing same and thereby causing the particulate matter to flow out of the second zone and through the discharge opening provided in the lower section of the container. After the fluidization of the second zone, the first fluidizing zone has a sufficient mass of particulate matter so that the unit is ready for another cycle.

Various means can be employed to terminate gas flow to the first zone when the desired amount of particulate matter has been fed to the container. For example, a mercury float switch which senses the level of fluidized material in the chamber or suitable timers can be employed.

Figure 1:
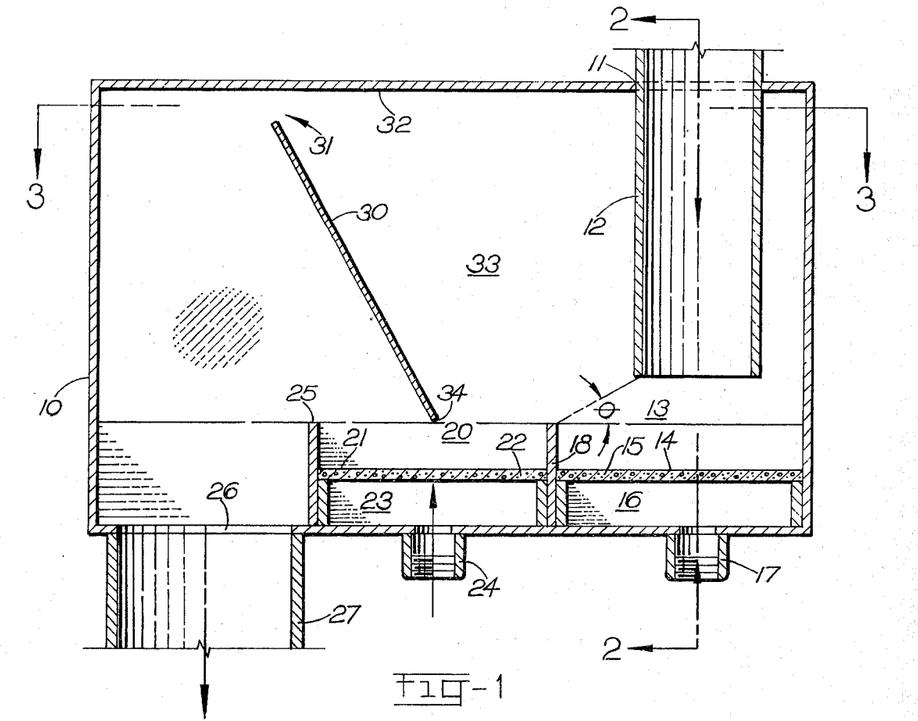
FIG. 1 is a cross-sectional view of one embodiment of the invention.
Figure 2:
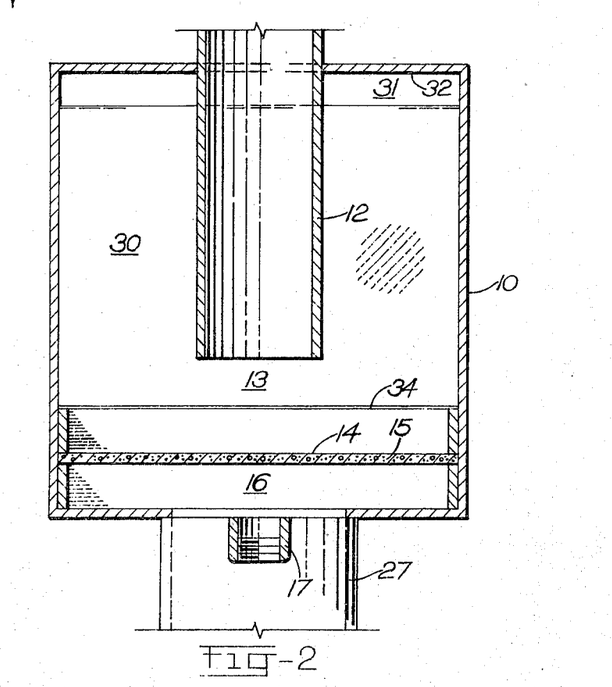
FIGS. 2 and 3 are cross-sectional views taken in the direction indicated in FIG. 1.
Figure 3:
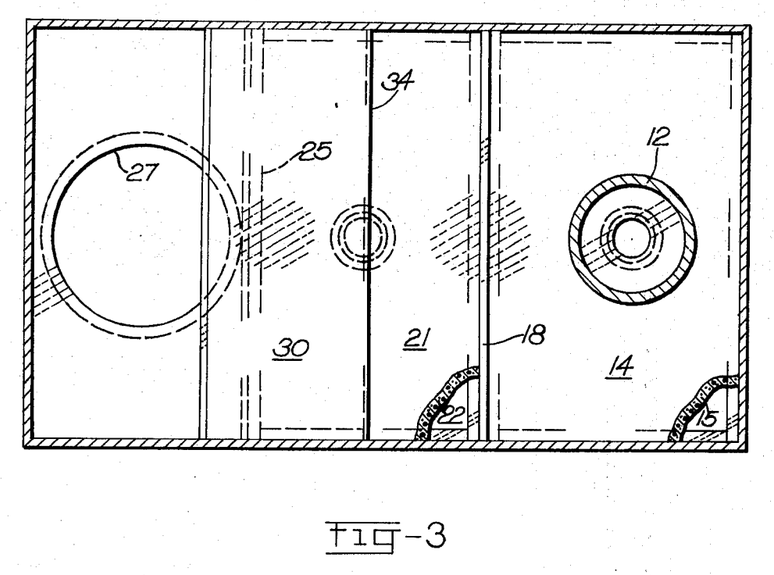
Figure 4:
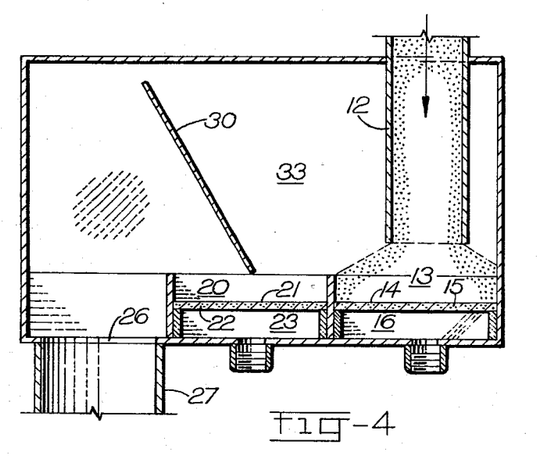
FIGS. 4–7 are identical views shown in FIG. 1 illustrating the operation of the feeding device.

Reference is made to FIGS. 1, 2 and 3 which illustrate one embodiment of the invention. Container 10 is provided with a feed opening 11 through which a feed pipe or downspout 12 is fitted and sealed. Beneath the downspout 12 is disposed a first fluidizing zone 13 which is defined in part by the upper surface 14 of a porous diffuser plate 15. A gas supply chamber 16 is disposed beneath the diffuser plate 15 and gas is supplied to the chamber 16 through conduit 17. A retaining wall or ridge 18 is provided along a portion of the periphery of the surface 14. The height of the wall or ridge 18 and the position of discharge of downspout 12 are preferably such that the upper edge of ridge 18 makes angle $\theta$ with lower edge of the downspout 12 which is equal to or less than the angle of repose of the particulate matter being fed. A second fluidizing zone 20, disposed adjacent the first zone 13, is defined in part by upper surface 21 of a porous diffuser plate 22. A gas supply chamber 23 is disposed beneath plate 22 and a conduit 24 is provided for supplying gas to chamber 23. A second retaining wall 25 is disposed on the edge of surface 21 opposite the first retaining wall 18. A discharge opening 26 and conduit 27 are provided on the other side of retaining wall 25. A baffle or wall 30 depends from the upper portion of the container 10 and terminates a short distance from the surface 21. An opening 31 is provided between the upper edge of the baffle 30 and the top 32 of container 10. The baffle 30 in conjunction with the top and sides of container 10 and the fluidizing surfaces 14 and 21 generally define a chamber 33 within the container 10. The lower edge 34 of baffle 30 is positioned so that particulate matter will cover most, if not all, of fluidizing surface 21 when fluidized particulate matter settles in chamber 33.

Figure 5:
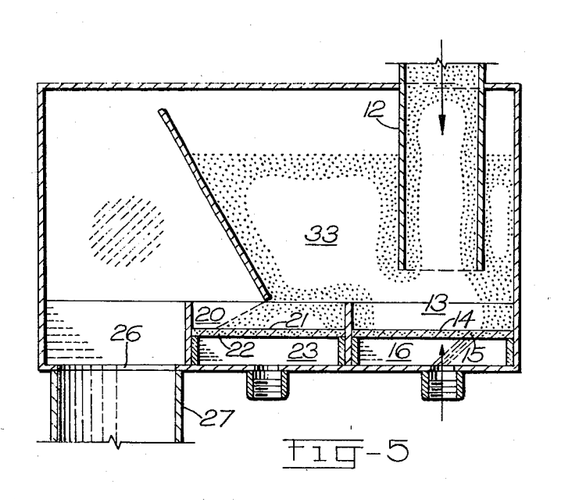
Figure 6:
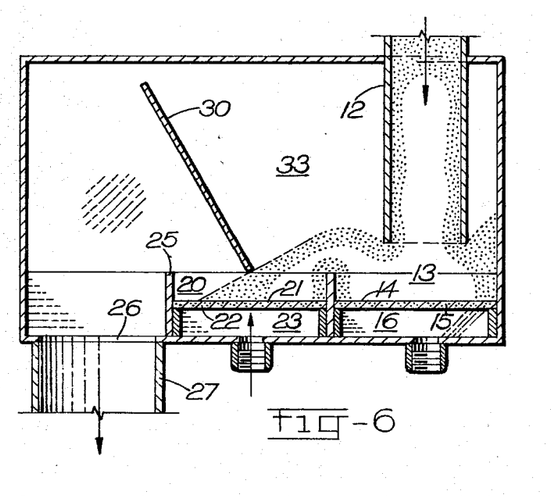
Figure 7:
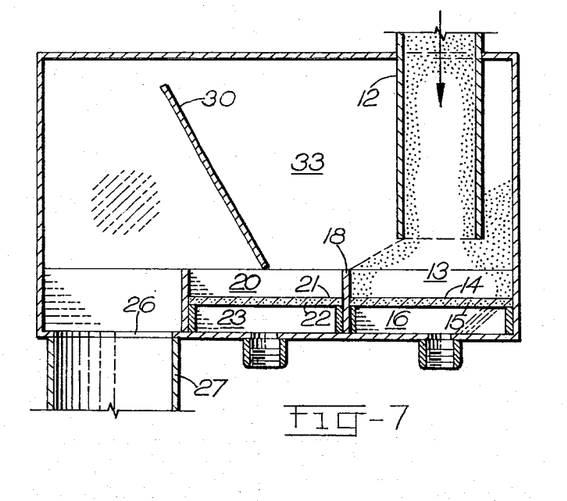

The operation of the device is generally shown in the series of drawings FIGS. 4–7. Starting with FIG. 4, particulate matter feeds from a source (not shown) through downspout 12 into the first fluidizing zone 13 until the cone-shaped mass reaches the discharge end of the feed pipe 12, at which time particulate flow ceases. In FIG. 5, gas is introduced into the particulate mass in zone 13, fluidizing same causing the fluidized mass to flow out of the first zone and causing further feeding of particulate matter from feed pipe 12 into the fluidizing zone 13. Fluidization continues in the first zone until chamber 33 is filled to the desired level as shown and then the flow of gas into zone 13 is terminated. As shown in FIG. 6, the fluidized mass settles with part of the mass being disposed in the second fluidizing zone 20. Gas is then introduced into the particulate mass in the second fluidizing zone 20, fluidizing same and causing the mass of particulate matter to flow out of the second zone, over the retaining wall 25 and out of the discharge opening 26. After a predetermined amount of fluidization has occurred, gas flow to the second fluidizing zone is terminated. When particulate settling in chamber 33 occurs, the mass of particulate matter in the first zone again builds up to the discharge end of pipe 12, so that, as shown in FIG. 7, upon termination of gas flow to the second zone, the feeding unit is ready for another cycle. The retaining wall 18 prevents any significant feeding of particulate matter through the downspout 12 into the second zone 20 during the fluidization thereof.

Figure 9:
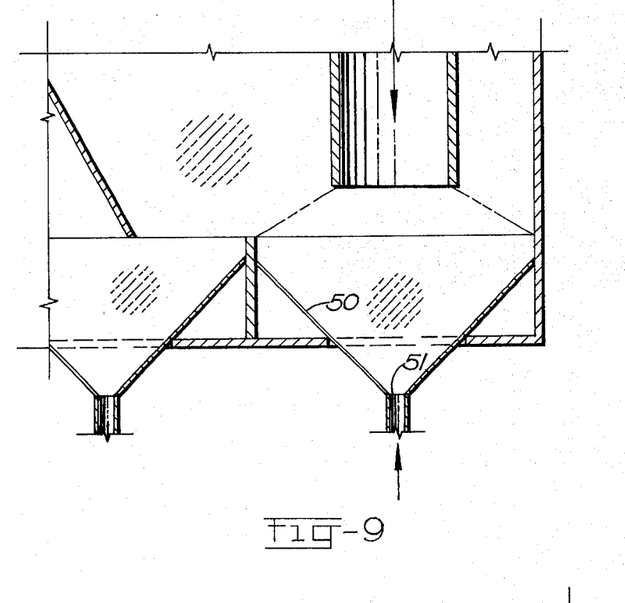
FIG. 9 is a modified fluidizing zone useful in the invention.

The fluidizing members 14 and 21 in FIGS. 1–3 are shown as porous diffuser plates, and they may be made of any convenient material, such as porous bronze, porous refractory material and the like. Other materials, such as porous fabric which is frequently used in air slides, can also be used. Furthermore, one or both of the fluidizing zones can be constructed as shown in FIG. 9 wherein the fluidizing zone comprises a conical container 50 with a fluidizing gas entry 51 disposed at the bottom of the conical container 50.

Figure 8:
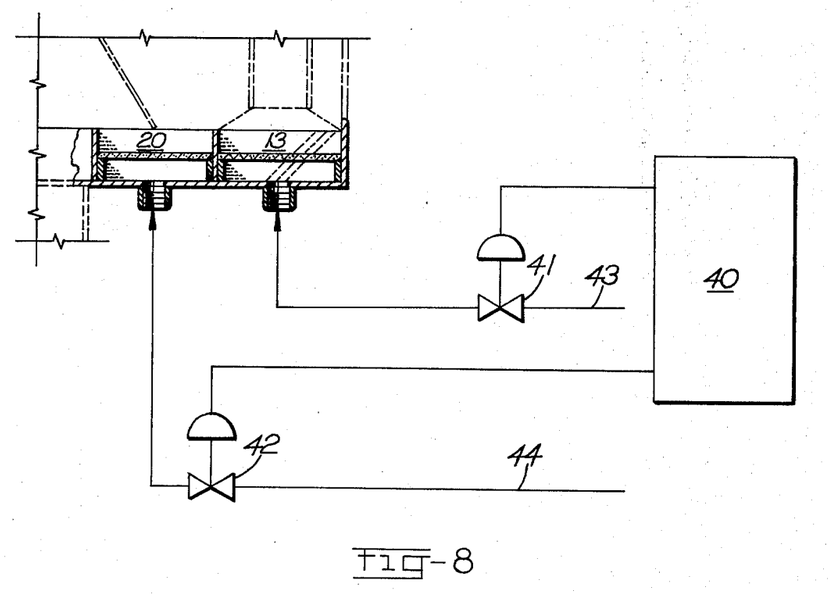
FIG. 8 is schematic drawing of a control means for the feeder.
Figure 10:
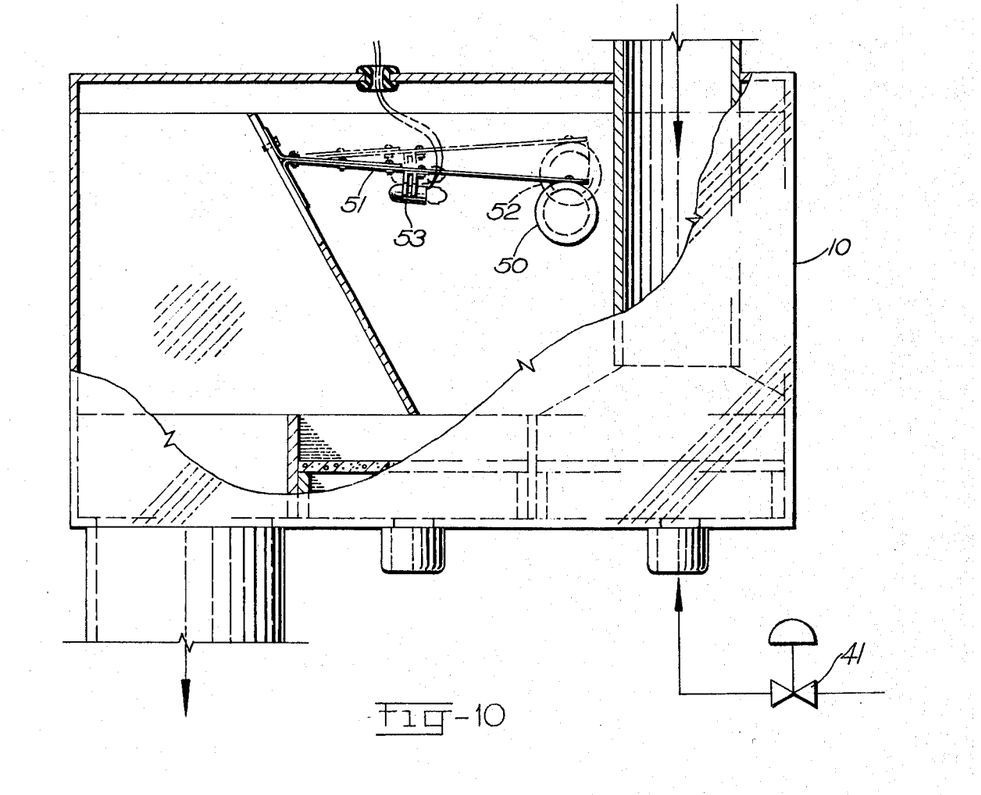
FIG. 10 is a side view partially in section of a means to control the feeder of the invention.

As shown in FIG. 8, the gas flow to fluidizing zones 13 and 20 can be controlled by a suitable timing device 40 in conjunction with control valves 41 and 42 on gas supply lines 43 and 44. At the start of operations, control valve 41 is opened causing the fluidization of the particulate mass in zone 13. After a predetermined duration, valve 41 is caused to be closed by timer 40, terminating the fluidization in zone 13. Valve 42 is then caused to be opened by timer 40, resulting in the fluidization of the particulate mass in zone 20. After a predetermined duration of fluidizing in zone 20, valve 42 is caused to be closed by timer 40. The time between opening and closing of valves 41 and 42 are appropriately chosen to cause a desired amount of particulate matter to flow. Moreover, delays between the fluidization in zone 13 and the fluidization in zone 20 can be effected to allow time for the fluidized mass in chamber 33 to settle. If desired, the gas flow termination to fluidizing zone 13 can be controlled by a level sensing device as shown in FIG. 10. In this drawing, the level sensing device 50 comprises a flexible arm assembly 51 having a spherical float 52 on the end thereof. A mercury float switch 53 is provided on the arm to activate the closing of valve 41.

Figure 11:
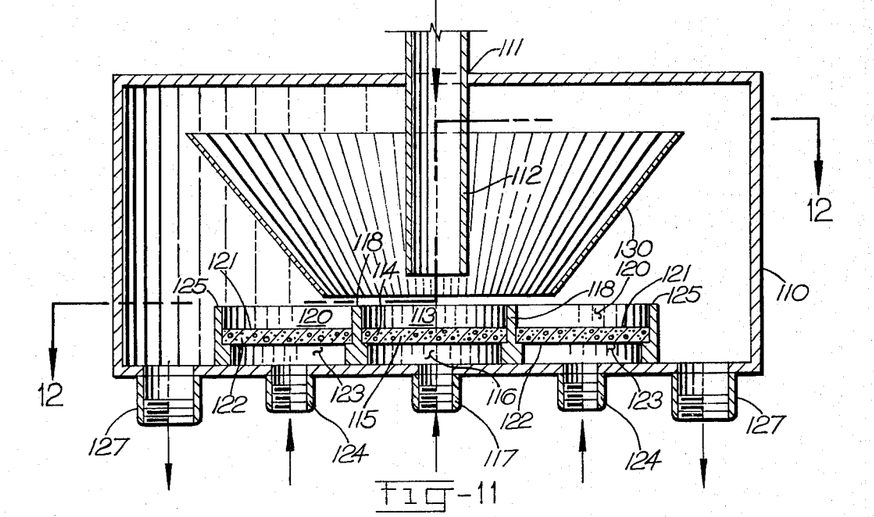
FIGS. 11 and 12 are respectively side and plan views in section of another embodiment wherein the feeder is cylindrical in shape.
Figure 12:
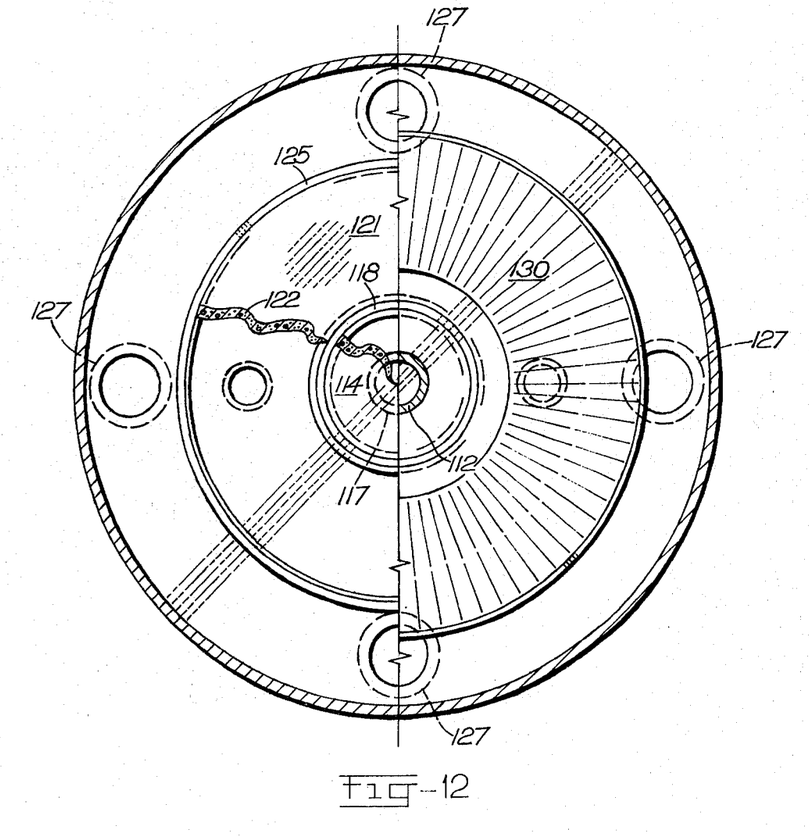

Another embodiment of the invention is shown in FIGS. 11–12, wherein the container 110 is cylindrical rather than rectilinear as shown in FIGS. 1–3. In this embodiment, the feed pipe 112 enters the center of the container through opening 111 and is disposed above a generally circular, centrally located, first fluidizing zone 113 defined in part by upper surface 114 of diffuser plate 115. Gas supply chamber 116 and conduit 117 are disposed beneath plate 115. A retaining wall 118 is disposed around the complete periphery of the surface 114. Concentric with first zone 113 is a second fluidizing zone 120 defined in part by upper surface 121 of diffuser plate 121 which has a generally circularly shaped outer periphery. A gas supply chamber 123 and conduit 124 are disposed beneath plate 121. A second retaining wall 125 is disposed about the periphery of zone 118. A frustoconical baffle 130 is disposed above the second fluidizing zone 119. The unit operates in the manner previously described for the embodiment of FIGS. 1–3.

Figure 13:
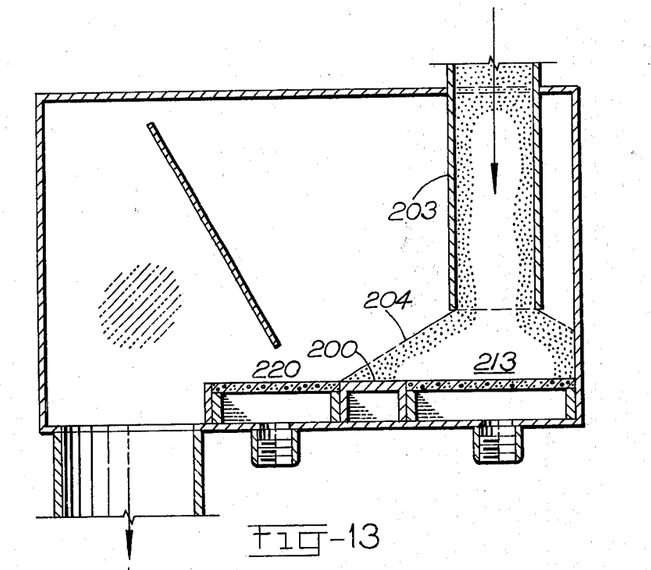
FIG. 13 is a modification of the feeder shown in FIG. 1.

Although in the above-described embodiments a retaining wall is shown between the first and second fluidizing surfaces, other means can be employed to prevent the feeding of significant quantities of particulate matter from the first fluidizing zone to the second fluidizing zone, except when fluidizing the particulate mass in the first zone. For example, as shown in FIG. 13, a nonfluidizing zone 200 is disposed between the first zone 213 and the second zone 220. The nonfluidizing zone 200 is sufficiently wide so that when the flow of particulate matter through the feed spout 212 ceases due to the frusto-conical mass 204 of particulate matter building up to the discharge end of the pipe 212, no significant portion of the mass 204 lies in the second fluidizing zone 220.

Figure 14:
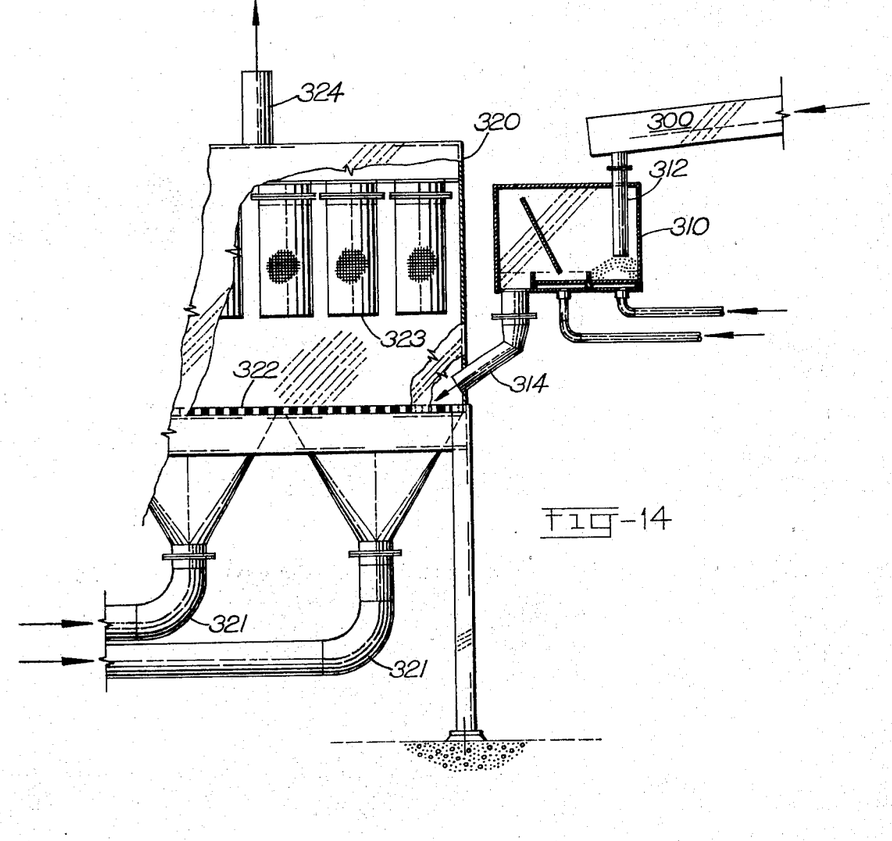
FIG. 14 is a side view in section illustrating the feeder in conjunction with a gas-solids contacting device.

Reference is made to FIG. 14 which illustrates the feeder of the invention in conjunction with a gas-solids contacting device. In this figure, a relatively continuous supply of particulate matter is provided from air slide 300 to the feeder 310 through feed pipe 312. The mass of particulate matter in the feeder, feed pipe and bin prevents any pressure drop losses through the feeder. The feeder 310 is essentially that shown in FIGS. 1–3. The discharge pipe 314 feeds the particulate matter into the gas-solids contacting device 320. The contacting device 320 comprises gas inlets 321, a dispersion plate 322 and filter bags 323. Gas is directed through the dispersion plate 322 to maintain the pulverulent material in unit 320 in a turbulent condition, the particulate matter is separated from the gaseous stream by passing the stream through the filter bags 323 and then the gas is discharged through conduit 324 to the atmosphere or other treatment facilities. Frequently, it may be desirable to feed particulate matter in the manner of the invention into the gaseous stream prior to the gas-solids apparatus as shown in co-pending application Ser. No. 321,412 and now abandoned which is assigned to the present assignee.

The invention has particular utility in the treatment of the fluoride containing gases which are emitted from a Hall-type electrolytic cell for the production of aluminum. Frequently, these cell off-gases are treated with the cell feed alumina ($Al_2O_3$) in a gas-solids reactor device such as shown in FIG. 14 to sorb the fluoride in the gas (usually HF) onto the surfaces of the alumina particles during the intimate contact in the gas-solids reactor. The fluoride containing $Al_2O_3$ is fed to the cell, thereby recycling the fluoride back to the cell. The feeder of the invention can be advantageously used to feed the alumina to the gas-solids reactor without an extensive pressure drop in the reactor or dust losses to the atmosphere.

It is obvious that various modifications and improvements can be made to the invention without departing from the spirit thereof and the scope of the appended claims.

What is claimed is:

1. A device for feeding discrete quantities of particulate matter comprising
    a. a substantially closed container provided with a conduit for feeding particulate matter into the container, the discharge end of said conduit extending into the inner peripheral area of the container;
    b. a first fluidizing zone disposed beneath the discharge end of the feed conduit which receives particulate matter from the feed conduit and allows an unfluidized mass of particulate matter to build up to the discharge end of the conduit, thereby terminating the further feeding of particulate matter from the feed conduit, the distance between the first fluidizing zone and the discharge end of the conduit being such that the first fluidizing zone is essentially covered with unfluidized particulate matter upon the termination of particulate feeding from the conduit due to particulate build-up thereto;
    c. a second fluidizing zone disposed adjacent the first fluidizing zone which receives particulate matter from the first zone;
    d. means to introduce gas into the first fluidizing zone to fluidize particulate matter therein, causing fluidized particulate matter to flow out of the first fluidizing zone into the second fluidizing zone and causing additional particulate matter to be fed from the feed conduit to the first fluidizing zone, said fluidizing means provided with means to continue fluidization in the first fluidizing zone until a desired amount of particulate matter is fed to the container from the feed conduit, and then to terminate fluidization in the first fluidizing zone; and
    e. means responsive to the termination of gas flow in the first fluidizing zone to introduce gas into the second fluidizing zone to fluidize particulate matter which has settled therein, causing fluidized particulate matter in the second zone to flow out of the second zone and through a discharge opening provided in the container.

2. The feeding device of claim 1 having a baffle disposed above the second fluidizing zone which defines in part a chamber within the container which is adapted to contain fluidized particulate matter from the first fluidizing zone, said baffle inclined from the vertical so as to direct at least a portion of said contained particulate matter to the second fluidizing zone upon the termination of fluidization in the first fluidizing zone.

3. The feeding device of claim 2 provided with a level sensing device which is disposed in the chamber partly defined by the baffle and which terminates the gas flow to the first fluidizing zone when actuated by rising fluidized particulate matter within said chamber.

4. The feeding device of claim 1 wherein each means to introduce gas into the first and second fluidizing zones comprises in part a porous member beneath which is a gas supply means.

5. The feeding device of claim 4 wherein the porous member is formed of a material selected from the group consisting of porous bronze, porous refractory and porous fabric.

6. The feeding device of claim 1 having means to initiate the gas flow into the first fluidizing zone and to terminate same when a desired quantity of particulate matter has been fed into the container from the feed conduit.

7. The feeding device of claim 6 having means to initiate the gas flow into the second fluidizing zone after the termination of the gas flow to the first fluidizing zone.

8. The feeding device of claim 1 having means disposed between the first fluidizing zone and the second fluidizing zone to prevent the feeding of significant amounts of particulate matter from the first zone to the second zone when no fluidization is occurring in the first fluidizing zone.

9. A method of feeding discrete quantities of particulate matter comprising
    a. feeding particulate matter through a feed conduit into a first fluidizing zone disposed within an essentially closed container with the discharge end of the feed conduit extending into the inner portion of the container, said feeding through the conduit continuing until the unfluidized mass of particulate matter essentially covers the first zone and builds up to the discharge end of the feed conduit thereby terminating the further feeding of particulate matter from the feed conduit,
    b. introducing gas into the unfluidized mass of particulate matter in the first zone to fluidize same, thereby causing the fluidized particulate matter to flow out of the first zone into a chamber within the container and causing the further feeding of particulate matter from the feed conduit,
    c. terminating the gas flow into the first zone and allowing at least part of the fluidized particulate matter to settle in a second fluidizing zone disposed adjacent the first zone, and
    d. responding to the termination of the gas flow in the first zone, to introduce gas into the particulate matter in the second fluidizing zone to fluidize same, thereby causing fluidized particulate matter to flow out of the second zone and through a discharge opening provided in the container.

10. The method of claim 9 wherein the level of the fluidized particulate matter in the chamber is determined by a level sensing means and when the fluidized particulate matter level reaches a predetermined level, the gas flow to the first zone is terminated by means responsive to the level sensing means.

11. A method of feeding discrete quantities of particulate matter to a gas-solids contacting device wherein particulate matter is brought into intimate contact with gas comprising a. feeding particulate matter through a feed conduit into a first fluidizing zone disposed within an essentially closed container with the discharge end of the feed conduit extending into the inner portion of the container, the feeding through the conduit continuing until an unfluidized mass of particulate matter essentially covers the first zone and builds up to the discharge end of the feed conduit, thereby terminating the further feeding of particulate matter from the feed conduit, b. introducing gas into the unfluidized mass of particulate matter in the first zone to fluidize same, thereby causing the fluidized particulate matter to flow out of the first zone into a chamber within the container and causing the further feeding of particulate matter from the conduit into the first zone.

c. terminating the gas flow into the first zone allowing at least part of the fluidized particulate matter in the chamber to settle into a second fluidizing zone disposed adjacent the first zone, and d. responding to the termination of the gas flow in the first zone to introduce gas into the particulate matter in the second zone to fluidize same and thereby cause fluidized particulate matter to flow out of the second zone, through a discharge opening in the container and into the gas-solids contacting device wherein the particulate matter is brought into intimate contact with the gas.

12. The method of claim 11 wherein the particulate matter is alumina and the gas in the contacting device contains a fluoride compound.

* * * * *